Patented Dec. 5, 1933

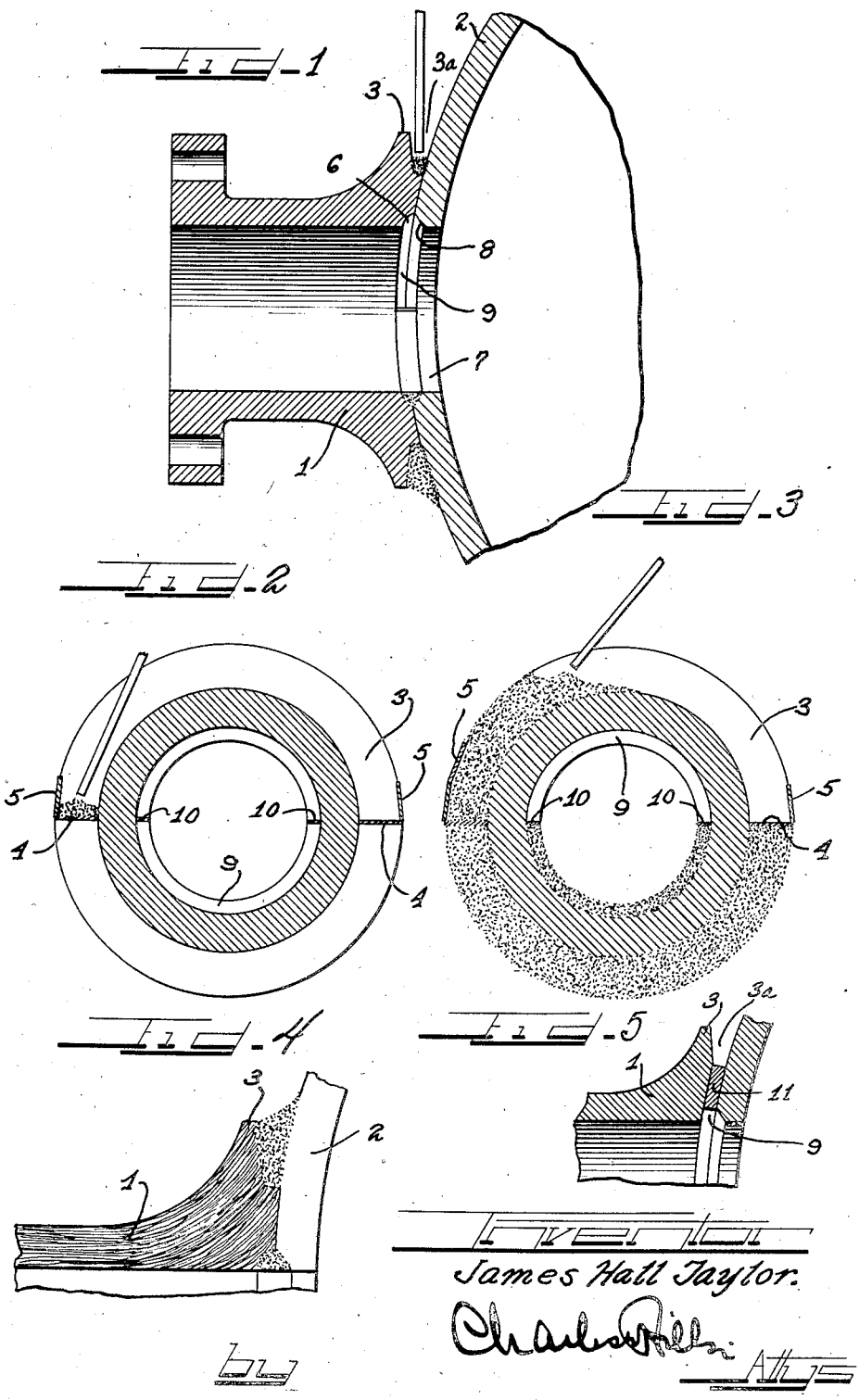

1,937,605

UNITED STATES PATENT OFFICE 1,937,605

METHOD OF ATTACHING NOZZLES TO HOLLOW BODIES

James Hall Taylor, Chicago, Ill.

Application February 1, 1932. Serial No. 590,234

8 Claims. (Cl. 29—157)

This invention relates to a method of attaching nozzles to hollow bodies.

The object of the invention is to provide a method of welding a nozzle to a hollow body such as a pressure vessel, that eliminates a great deal of the labor and time that was heretofore required and renders the operation of welding very simple and easy to perform. To this end, the method also involves the formation of a nozzle that is readily applicable for carrying out the method.

This process greatly reduces the time usually required for attaching a nozzle in that the puddling groove allows a higher temperature in welding or a more liquid welding metal to be used. Furthermore, this high speed process is carried on with the tank in but two positions whereby much time and labor is saved as it avoids the constant moving of the tank. This process produces a product of superior quality and lower costs due to its novel design.

The invention comprises the novel method hereinafter described and more particularly pointed out and defined in the appended claims.

In the drawing which illustrates a preferred method for carrying out this invention and in which similar reference numerals refer to similar features in the different views:

Figure 1 is a sectional view of a nozzle and a fragment of a hollow body which are being welded together according to the method involving this invention.

Figure 2 is a transverse sectional view through the nozzle taken through the welding groove and illustrating a portion of the welding operation.

Figure 3 is a view similar to Figure 2 but illustrating the welding operation in an advanced stage.

Figure 4 is a fragmentary elevational view of the nozzle and hollow body illustrating the direction of the grain in the nozzle.

Figure 5 is a fragmentary sectional view illustrating a modified method of forming the welding groove.

According to this invention, a nozzle 1 for attachment to a hollow body 2 is formed, with an enlarged base comprising a lower thickened portion forming an outwardly extending flange with a curved upper surface which allows a wide welding groove 3a to be formed at the outer margin of said flange and a yieldable lip 3 around the periphery of said flange. The groove 3a may be formed by rabbetting the outer margin of the base, or forming an annular recess therein, or by inserting a ring or washer 11 between the base and pressure vessel as shown in Figure 5. The nozzle 1 is preferably grooved or chamfered upon its lower inner edge as indicated at 6, and the upper edge of the aperture 7 in the hollow body 2 is likewise chamfered as indicated at 8 to form a welding groove 9 between such chamfered portions.

After the parts are fashioned as above set forth, the nozzle and hollow body are maintained in contacting relation with the welding grooves 3a and 9 in substantially a vertical plane or at any suitable angle to a horizontal plane. The upper portion of the groove 3a is then dammed up by welding metal across the groove or by suitable plate members 4 as shown in Figure 2, and the groove between the dams 4 is then filled with fusing welding metal from a coated rod, the chilling of the metal forming a sort of film upon the outer surface thereof to prevent the welding metal from running from the groove. Due to the relatively deep welding groove, oxidation with respect to the fused metal is largely eliminated. In some instances, especially on heavier work, it may be desirable to dam the groove upwardly from the dam plates 4. In such instances, dam plate 55 may be used for damming up the outer portions of the groove for a suitable distance from the plates 4 as shown in Figures 2 and 3. Generally the metal is fused into the groove against one dam plate to a point near the top of the groove.

Welding metal is then fused into the groove adjacent the other dam upon the right side of the hollow body, and this groove is further welded as just described. The welding operation will continue until the space between the dam plates 4 is completely filled with welding metal. The upper portion of the interior groove 9 may then be filled with fused welding metal as just explained.

After the upper portions of the grooves 3a and 9 have been filled with fusing welding metal as just explained, the hollow body may be rotated through 180°, to bring the lower portion of the grooves 3a and 9 uppermost. The upper portions of the grooves 3a and 9 which were previously the lower portions may now be filled with fusing welding material using the damming up process as previously explained if necessary. After the welding, the dam plates 5 if used may be removed.

The nozzle 1 is preferably formed with the grain thereof extending in a downward direction, and in an outward curved direction at the base thereof as shown in Figure 4 to obtain a stronger cohesion of the parts during the welding operation. There is always more or less contraction during the cooling of the fused welding metal; and to overcome the tendency of the parts to crack, the lip 3 is invented to yield downwardly during contraction.

It will be appreciated that according to this method, it becomes a very simple and easy matter to weld a nozzle to a hollow body, especially in view of the fact that it merely requires the hollow body to be swung or rotated once during the welding operation. In short, the method involves merely the welding of the upper, outer and interior portions and then turning the hollow body to bring the lowermost unwelded portion of said grooves to an uppermost position and duplicating the welding operation.

I am aware that changes and variations may be made in both the method and different steps in said method and therefore purpose to include such equivalent steps or method as may be embraced within the appended claims.

I claim as my invention:

1. The herein described method of forming and attaching a nozzle to a hollow body which consists in forming a nozzle with a thickened attaching portion having an outwardly directed tapering flange, with a rabbet in the outer margin of said flange for forming a welding groove with a lip thereabove, bringing the thickened portion of said nozzle into contacting relation with said hollow body and with said welding groove in a substantially vertical plane, damming a portion of said groove, filling said portion with fusing welding material, rotating said hollow body and filling another portion of said groove with fusing welding metal.

2. The herein described method of attaching a nozzle to a pressure vessel which consists in forming a nozzle with a thickened attaching portion having a radially extending attaching flange, forming a relatively wide welding groove in the bottom of said flange with a yieldable lip, bringing said nozzle and hollow body in proper contacting relation with said welding groove in angular relation to a horizontal plane, and filling said groove with fusing welding metal by means of an electric arc.

3. The method of attaching a nozzle to a hollow pressure vessel which consists in forming a nozzle with a radially extending flange, with a rabbet in the outer margin thereof to provide a wide welding groove with a lip adapted to bend toward said hollow body, bringing said nozzle into proper contacting relation with said vessel with said welding groove in angular relation to a horizontal plane, damming an arcuate portion of said groove, filling said portion with fusing welding metal, rotating said vessel and filling the remainder of said groove with fusing welding metal.

4. The method of attaching a nozzle to a hollow pressure vessel which consists in forming a nozzle with a thickened radially extending attaching portion, and with a wide welding groove extending inwardly from the outer margin of said portion, bringing said nozzle into proper contacting relation with said vessel with said groove in angular relation to a horizontal plane, damming a portion of said groove, filling said dammed portion with fusing welding metal, rotating said vessel and filling the remainder of said groove with fusing welding metal and welding an interior portion of said attaching portion to said vessel.

5. The method of attaching a nozzle to a hollow pressure vessel which consists in forming a nozzle with an enlarged base with a rabbet in its outer margin, positioning said nozzle against said hollow vessel to provide a welding groove between the exterior surface of said vessel and the wall of said rabbet, damming a portion of said groove and filling the same with fusing welding metal, then rotating said vessel and filling the remainder of said groove with welding metal.

6. The method of attaching a nozzle to a hollow pressure vessel which consists in forming a nozzle with an enlarged base, positioning a ring between said base and hollow vessel for forming an outer welding groove, damming a portion of said groove and filling the same with fusing welding metal, rotating said hollow body and filling the remainder of said groove with fusing welding metal.

7. The method of attaching a nozzle to a hollow pressure vessel which consists in forming a nozzle with an enlarged base and a welding space in the outer portion thereof, bringing said base and vessel into welding relation with said space in a substantially vertical plane, damming a portion of said space, filling the same with fusing welding metal, rotating said vessel and filling the remainder of said groove with fusing welding metal.

8. The method of attaching a nozzle to a hollow pressure member which consists in forming a nozzle with an enlarged base and forming means associated with said base and hollow member when the same are in welding relation for creating a welding groove between the outer portion of said base and said hollow member, positioning said parts in welding relation, damming a portion of said groove and filling the same with fusing welding metal, then rotating the hollow member and filling the remainder of said groove with fusing welding metal.

JAMES HALL TAYLOR.